May 19, 1925.
R. S. BLAIR
COOLING DEVICE
Filed Aug. 19, 1922
1,538,159
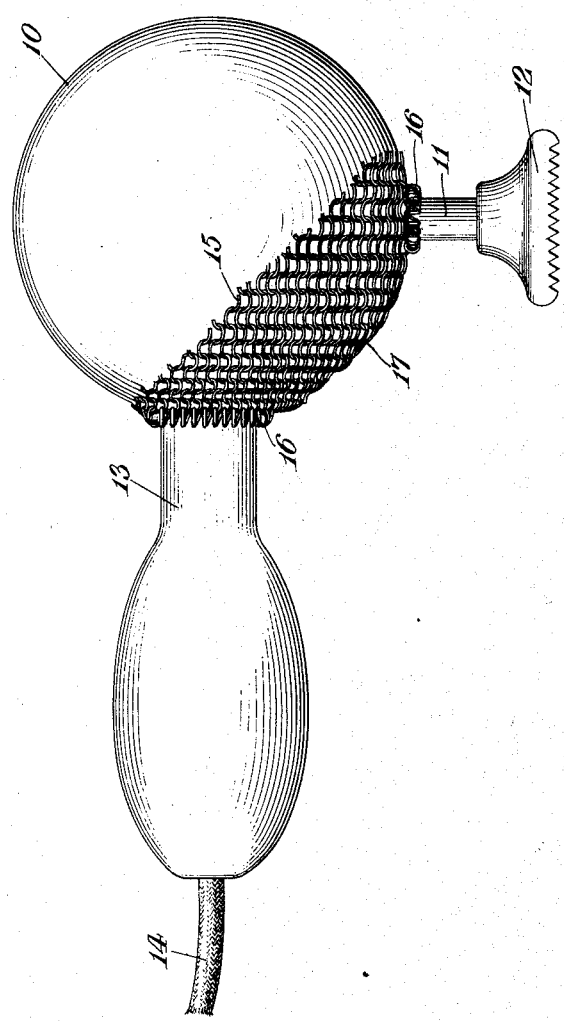

Patented May 19, 1925.

1,538,159

UNITED STATES PATENT OFFICE.

ROBERT S. BLAIR, OF STAMFORD, CONNECTICUT.

COOLING DEVICE.

Application filed August 19, 1922. Serial No. 582,991.

*To all whom it may concern:*

Be it known that I, ROBERT S. BLAIR, a citizen of the United States, and a resident of Stamford, in the county of Fairfield and State of Connecticut, have invented an Improvement in Cooling Devices, of which the following is a specification.

This invention relates to cooling devices and, with regard to its more specific features, to devices for effecting the cooling of the exterior surfaces of small hand-operated electrical instruments and the like.

One of the objects thereof is to provide a device of the above nature adapted to effectually cool the exterior casing about a heat-generative device such as, for example, an electric motor or the like. Another object is to provide a device of the above nature readily attachable to the exterior of a casing about a heat-generative mechanism. Another object is to provide a device of the above nature adapted to render hand-operated electrical devices more conveniently manipulated and handled. Other objects will be in part obvious or in part pointed out hereinafter.

The invention accordingly consists in the features of construction, combinations of elements and arrangements of parts as will be exemplified in the structure to be hereinafter described and the scope of the application of which will be indicated in the following claims.

In the accompanying drawing in which is shown one of the various possible embodiments of this invention there is represented a side elevation of an electrical hand vibrator.

Referring now to the accompanying drawing, the instrument shown comprises a metallic casing 10, generally spherical in form as shown, within which is mounted an electrical mechanism, such as a motor or vibrator coils, which, through a shaft 11, acts to vibrate a flexible applicator, as 12, removably secured thereto. Connected to the casing 10 is a short handle member 13 through which wires 14 pass supplying current to the motor or coils within the casing 10.

The instrument is operated by hand and the handle 13 is grasped in close proximity to the casing 10, or more often the spherical casing 10 itself is grasped in the hand as this latter method forms the most convenient way of holding the instrument for easy manipulation. It will be readily understood that it is particularly advantageous to hold the device directly about the casing 10 since in this position the hand is directly over the applicator 12 and the latter may be guided as desired conveniently and easily. When the motor or coils within the casing 10 are energized, they generate heat which is radiated to the casing 10, and unless provision is made for carrying away this heat the casing 10 will become too warm to be comfortably handled.

To overcome this difficulty by providing for the ready removal of heat from the exterior surface of the casing 10 there is provided an outer covering which preferably takes the form of a woven metal fabric or chain covering 15 fitted snugly against the surface of the casing 10. The covering 15 thus resting against the outside of the casing 10 acts to cool the latter by providing a large radiating surface and thus permitting the heat from the casing 10 to be readily dissipated by radiation. Thus, in a simple and effective manner the casing 10 is prevented from becoming excessively warm due to the heat from the electrical mechanism therein, and handling of the instrument as above described is greatly facilitated. The chain covering 15 may be secured to suitable springs 16 about the openings therein through which the handle 13 and the shaft 11 pass to hold the covering snugly in place, and the covering may be split on a line between these two openings, as at 17, to permit its being slipped on or off the casing 10.

It will thus be seen that there is herein provided a device which embodies the various features of this invention, which device in its action attains the various objects of the invention and is well adapted to meet the requirements of practical use.

As various possible embodiments may be made of this invention and as many changes might be made in the embodiment herein set forth, it is to be understood that all matter hereinbefore set forth or shown in the accompanying drawing is to be interpreted as illustrative and not in a limiting sense.

I claim as my invention:—

1. In a device of the class described, in combination, an electrical device adapted to be manipulated by hand, and means detachably secured about the surface thereof adapted to facilitate radiation of heat therefrom.

2. In a device of the class described, in combination, a power-generative device adapted to be manipulated by hand, and means detachably mounted thereon adapted to cool the same to facilitate handling thereof.

3. In a device of the class described, in combination, an electrically operated device adapted to be hand manipulated and comprising a metallic casing, and means removably positioned about said casing adapted to facilitate dissipation of heat therefrom generated by said device.

4. In a device of the class described, in combination, a heat-generative device having a metallic casing thereabout, and means comprising a flexible covering about the exterior of said casing adapted to increase the radiating surface thereof to facilitate radiation of heat therefrom.

5. In a device of the class described, in combination, an electrical device comprising a casing and mechanism therein adapted to generate heat, and means comprising a woven metallic member positioned upon said casing for facilitating removal of heat therefrom generated by said mechanism.

6. In a device of the class described, in combination, an electrical device comprising a casing and mechanism therein adapted to generate heat, and means comprising a flexible metallic web stretched about the surface of said casing to facilitate radiation of said heat therefrom.

7. In a device of the class described, in combination, a portable electrical device adapted to generate heat, and a removable metallic flexible covering closely surrounding said device and in contact therewith and formed to substantially increase its radiating surface.

In testimony whereof, I have signed my name to this specification this 12th day of August, 1922.

ROBERT S. BLAIR.